United States Patent [19]

Ahamed

[11] 3,781,822

[45] Dec. 25, 1973

[54] DATA RATE-CHANGING AND REORDERING CIRCUITS

[75] Inventor: Syed Vickar Ahamed, Berkeley Heights, N.J.

[73] Assignee: Bell Telephone Laboratories, Incorporated, Murray Hill, Berkeley Heights, N.J.

[22] Filed: Aug. 9, 1972

[21] Appl. No.: 279,020

[52] U.S. Cl. .............................. 340/172.5, 235/156
[51] Int. Cl. .............................................. G06f 7/00
[58] Field of Search ...................... 340/172.5, 146.2; 444/1; 235/156

[56] References Cited

UNITED STATES PATENTS

| | | | |
|---|---|---|---|
| 2,674,733 | 4/1954 | Robbins | 340/172.5 X |
| 3,034,102 | 5/1962 | Armstrong et al. | 340/172.5 |
| 3,226,693 | 12/1965 | Dumey | 340/172.5 |
| 3,428,946 | 2/1969 | Batcher | 340/172.5 X |
| 3,587,057 | 6/1971 | Armstrong | 340/172.5 |
| 3,702,393 | 11/1972 | Fuss | 235/156 |
| 3,704,452 | 1/1972 | Beausoleil et al | 340/172.5 |

*Primary Examiner*—Paul J. Henon
*Assistant Examiner*—Melvin B. Chapnick
*Attorney*—W. L. Keefauver et al.

[57] ABSTRACT

An input sequence of signals is processed by a cascaded plurality of stages, each stage including a plurality of unequal delay transmission paths, and means for directing selected portions of the input sequence through respective paths. By controlling the selection process at each stage, and by choosing suitable delay intervals, the rate of the input sequence may be increased or decreased by an integer factor and may be reversed in order. By combining various component circuits a fractional rate change may be effected.

7 Claims, 19 Drawing Figures

| NUMBER OF BITS DIVERTED BY GATES | | | | |
|---|---|---|---|---|
| $G_1$ | $G_2$ | $G_3$ | $G_4$ | $G_5$ |
| 16,10; | ;8,8,8,2; | ;4,4,4,4, 4,4,2; | ;2,2,... ...2,2; | ;1,1... ...1,1; |

| RATIO OF INPUT RATE TO OUTPUT RATE | NUMBER OF BITS IN GROUPS ALTERNATELY DIVERTED BY GATES AT EACH STAGE | | | | | | DIFFERENCE IN DELAY PERIODS AT EACH STAGE | | | | | |
|---|---|---|---|---|---|---|---|---|---|---|---|---|
| 1:m | STAGE | 1 | 2 | 3 | --- | $a$ | STAGE | 1 | 2 | --- | $a-1$ | $a$ |
| | BITS | $2^0$ | $2^1$ | $2^2$ | --- | $2^{a-1}$ | PERIOD | $k$ | $2k$ | --- | $2^{a-2}k$ | $2^{a-1}k$ |

DATA RATE-CHANGING AND REORDERING CIRCUITS

BACKGROUND OF THE INVENTION

1. Field of the Invention

The present invention relates to data transmission systems and, more particularly, to control circuitry for such transmission systems.

2. Description of the Prior Art

Various encoding and decoding schemes alter the length of blocks of data signals in data transmission systems. The addition of parity bits to a stream of information bits, for example, typically doubles the number of bits to be processed and transmitted. That is, for every information bit transmitted, there must also be transmitted a parity bit. In other cases, a parity bit may be required for each group of two or more information bits. Further, the parity or check signals generated and transmitted for a data stream are, in the usual case, interspersed among the data signals in the data stream. It is often necessary, therefore, in the typical bit-doubling example given, to alter the data stream to provide an interval between each two data bits such that a parity bit can be inserted.

One prior art scheme for permitting the transmission of both information and check signals during the time allotted for transmission of the information signals only is the so-called double-bucket arrangement. In accordance with this arrangement, a number of information bits in a data stream are applied to one of two shift registers at a first, or slow, rate. The data in this first shift register are typically used to generate a set of parity signals and the specified data signals and parity signals transmitted at a second, or faster, rate than that of the incoming information bits. While the information and parity bits are thus being transmitted at the faster rate, a second group of information bits is applied, again at the slower rate, to a second shift register which, in similar fashion to the first, generates parity signals. This second group of information and parity signals is, in turn, transmitted at the faster rate while new information bits are shifted into the first shift register at the slower rate. It is apparent that, in this typical prior art scheme, two distant clocks—one faster and one slower —are required to operate the system.

It is therefore an object of the present invention to accomplish the same rate-changing function as the above-mentioned double-bucket circuit without requiring the use of more than one clock.

It should be understood that the parity bit (or other) data-interleaving techniques of the prior art require the above-mentioned multiplicity of clocks when a complementary separation of date entities is required.

Thus, it is a further object of the present invention to permit the functions of collating, sorting, etc., of data signals to also be performed with a single clock.

SUMMARY OF THE INVENTION

Briefly stated, the present invention includes circuitry for performing various functions on streams of information bits, such as, rate changing, sorting, collating, encoding and decoding of data bits.

A cascaded plurality of stages each having a plurality of transmission paths and gating means for selectively diverting signals in an input sequence results in an output sequence bearing a predetermined relationship to the input sequence. By appropriately choosing the delays introduced in each of the transmission paths in each stage the input sequence is increased or decreased in rate or its order is reversed.

By combining various fundamental circuits in accordance with the instant invention, the rate of an input sequence may be changed by a non-integer factor. In particular, by cascading a basic rate increasing circuit with a basic rate decreasing circuit a composite circuit having the desired fractional rate increasing capability is realized. Collating and distributing circuits are likewise formed from fundamental circuits in accordance with the instant invention.

More generally, the circuits of the present invention comprise a number of series and/or parallel combinations of basic circuit elements which, in typical embodiment, delay and recombine specified bits in a data stream in a prescribed manner.

BRIEF DESCRIPTION OF THE DRAWING

The following detailed description of the present invention can be better understood when considered in conjunction with the accompanying drawing in which.

DETAILED DESCRIPTION OF THE PRESENT INVENTION

For purposes of the present discussion, a "period" is defined as the unit of distance by which a binary bit of information may be moved during one clock signal. A "clock signal" is the smallest unit of time and it is, correspondingly, the time required to propagate one binary bit by one period. In addition, a "gate" in the present context is a device for channeling selected information bits appearing on a single input path to one or another of two output circuit paths.

Figure 1D:
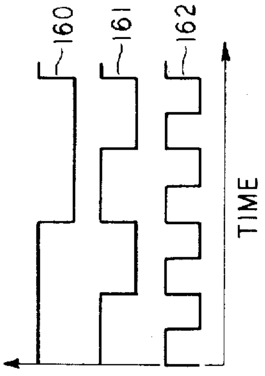
FIG. 1D illustrates typical control waveforms applied to the circuits shown in FIG. 1B.
Figure 1A:
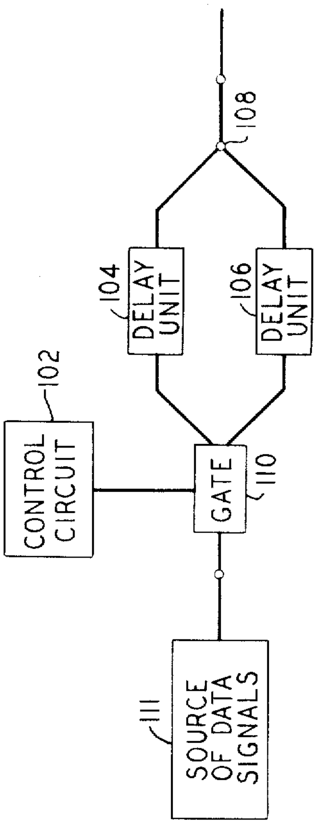
FIG. 1A shows a basic circuit element in accordance with a preferred embodiment of the present invention.

The circuits of the present invention comprise various combinations of specialized circuit elements illustrated in typical form in FIG. 1A. Each of these elements includes a gate 110 to which are applied data bits from a source, 111, and two delay units such as 104 and 106. The gate, in response to control signals from control circuitry 102, channels the data bits to one or the other of its two output paths. Each of these output paths, in turn, is connected to a corresponding delay unit (such as 104 and 106 in FIG. 1A) for delaying the data bits applied to it. The delay units of an element are advantageously chosen to provide a suitable delay. The gate output paths and the delay units therefore constitute the two branches of the element. The branches of the element are connected at a node 108 at which node the data bits transferred to each branch by gate 110 are "recombined". (Recombined, in its simplest form, means simply that the bits are applied to a common lead and need not necessarily imply that the bits are logically operated upon.) Thus, each of the elements described receives a series of data bits, causes certain ones of them to be applied to one of the branches of the element to be delayed by an interval having a first duration, causes others of them to be applied to the second branch to be delayed by an interval having a second duration, and finally causes the data bits to be applied to (recombined at) a common path. In this way the transmitted data bits (those departing node 108) can be made to assume a different order from those supplied by source 111.

In accordance with the present invention, again, the elements described are combined in various series and parallel arrangements to perform a number of operations on an input data stream. FIG. 1B, for example, shows a rate-reducing circuit for reducing the rate of an incoming data stream by a factor of 2. Specifically, the output data stream appearing on lead 101 is arranged to require a time to transmit which is equal to twice that required to apply the data stream on lead 103. Consider, then, a data block eight bits long which we wish to transmit at half the rate at which we receive it (in order, for example, to permit the interspersal of parity bits). The incoming 8-bit data stream on lead 103 of FIG. 1B can be characterized in polynomial form, thus:

$$u_0 = a_0x^0 + a_1x^1 + a_2x^2 + a_3x^3 + a_4x^4 + a_5x^5 + a_6x^6 + a_7x^7.$$

In this instance, $x^p, p = 0, 1, ..., 7$, represents the period occupied by a particular data bit, $a_p$, and $a_p$ in the case of binary data is either 1 or 0.

The signals on lead 103 are, in turn, applied to gate 100 which diverts the first four data bits (denoted $4_1$ in FIG. 1B) of the incoming data stream to the upper delay unit 105 and the second four data bits (denoted $4_2$ in FIG. 1B) to the lower delay unit 107. Delay units 105 and 107 are characterized by delays of duration $N_1$ and $N_1 + 4$, respectively. The incoming data signals thus diverted and delayed are recombined at lead 109 and can be represented in polynomial form as follows:

$$u_1 = x^{N_1}\ (a_0 + a_1x + a_2x^2 + a_3x^3)\ + x^{N_1+4}(a_4x^4 + a_5x^5 + a_6x^6 + a_7x^7)\ ,$$
$$= x^{N_1}\left\{x^0(a_0 + a_1x^1 + a_2x^2 + a_3x^3) + x^8(a_4 + a_5x^1 + a_6x^2 + a_7x^3)\right\}.$$

As seen in FIG. 1B, the data stream on lead 109 is applied to the next circuit element to the right of element 117. Gate 112 (again, as indicated by the vertical arrows and numerals in FIG. 1B) channels the first two bits of the stream appearing on lead 109 to the upper branch including delay unit 114 and channels the second two bits to the lower branch including the delay unit 116. In similar fashion, the third two bits of the data stream on lead 109 are channeled to the upper branch and the fourth two bits are channeled to the lower branch. The delays in each of the units 114 and 116 are namely, $N_2$ and $N_2 + 2$, respectively. Again, the data bits in each of the branches of this element are applied to, or recombined at, lead 118 and have a still different order from the arrangement appearing on lead 109. The data bits appearing on lead 118 are characterized by the polynomial:

$$u_2 = x^{N_1}\{x^{N_2}\ [x^0(a_0 + a_1x^1) + x^2(a_2x^2 + a_3x^3) + x^0(a_4x^8 + a_5x^9) + x^2(a_6x^{10} + a_7x^{11})]\}$$
$$= x^{N_1+N_2}\left\{x^0(a_0 + a_1x^1) + x^4(a_2 + a_3x^1) + x^8(a_4 + a_5x^1) + x^{12}(a_6 + a_7x^1)\right\}.$$

Lastly, the data stream on lead 118 is applied to a third element. Gate 122 of this third element applies alternate data bits on lead 118 to the upper and lower branches, one data bit to the upper branch and one data bit to the lower branch and so on for each of the eight data bits. Suitable delay intervals, in this case $N_3$ and $N_3 + 1$, are introduced into the diverted bit streams by delay units 124 and 126, respectively. The resulting reordered data stream appearing on lead 101 assumes the following polynomial characterization:

$$u_3 = x^{N_1+N_2+N_3}\ \left\{a_0 + a_1x^2 + a_2x^4 + a_3x^6 + a_4x^8 + a_5x^{10} + a_6x^{12} + a_7x^{14}\right\}.$$

A comparison of this last polynomial, $u_3$, with the polynomial characterizing the original data stream appearing on lead 103 clearly illustrates the fact that the position of each of the data bits on lead 101 is displaced in such a fashion that the original data stream is expanded to twice its original length while maintaining the original ordered arrangement of bits. For example, the data bit $a_4$ is no longer associated with the position $x^4$ but is now in the position $x^8$ and, similarly, the data bit $a_1$ is "shifted" into the third time slot, $x^2$, from the first time slot, $x^0$; the slot $x^1$ is now available for the transmission of, say, a parity bit.

Figure 1C:
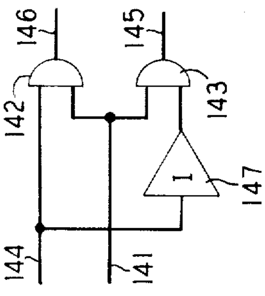
FIG. 1C shows, in detail, a typical gate circuit for use in the circuit of FIG. 1B.
Figure 1B:
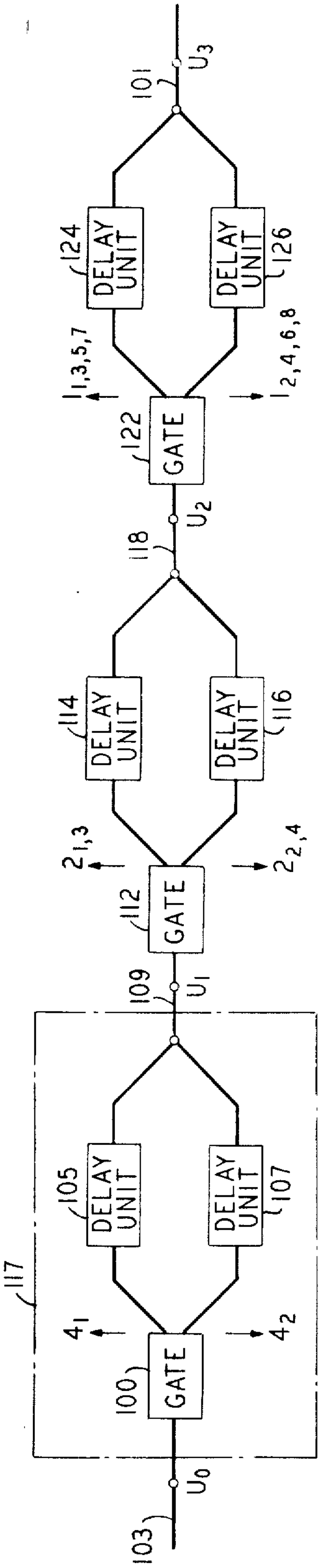
FIG. 1B shows a rate-reducing circuit in accordance with the present invention for reducing the rate of transmission of a block of eight data bits by a factor of two.

A more detailed representation of gate 110 in FIG. 1A is shown in FIG. 1C for a particular device technology. Thus assuming discrete transistor logic elements were used, it proves convenient to have the input signals applied at input lead 141. Lead 141 is in turn connected to one input of each of two 2-input AND circuits 142 and 143. The other input to AND circuit 143 is based on the control signal from control circuit 102 in FIG. 1A. Assuming this to be a binary valued square wave signal, it is clear that gate 142 will be effective to conduct input signals appearing on lead 141 to its output on lead 146 whenever the control signals appearing on lead 144 assume the 1 (high) state. Similarly, whenever the control signals on lead 144 assume the 0 state, AND circuit 143 is effective to conduct the signals from input lead 141 to output lead 145. Inverter 147 provides the required high signal to activate AND circuit 143.

Typical control waveforms for control signals applied to gates assuming the form indicated in FIG. 1C are shown in FIG. 1D. In particular, waveform 160 is periodic with period equal to 8 clock signals. This would typically be applied to gate 100 in FIG. 1B. The waveforms 161 and 162 are those typically associated with gates 112 and 122, respectively. Although not explicitly shown, it is clear that these control waveforms, and those shown or implied in the sequel, may be generated from standard clock pulse generators.

It is clear from the foregoing that the circuit of FIG. 1B, including three series-connected elements or stages, expands the number of bit positions occupied by an 8-bit data stream from eight to 16, which is to say, this circuit reduces the rate of transmission of those eight data bits by a factor of 2.

Figures 2A, 2B:
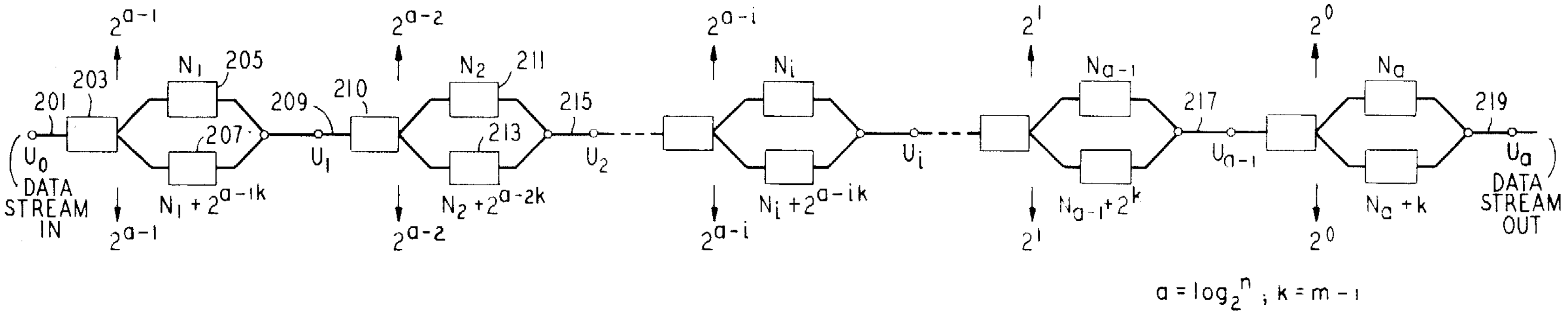
FIG. 2A shows a generalized rate-reducing circuit in which the rate of transmission is decreased by a factor of $m$ relative to the original rate.
FIG. 2B shows a table of specifications for rate-reducing circuits in accordance with a preferred embodiment of the present invention.

Applying the principles of the present invention, illustrated by means of the circuit for reducing the rate of an eight-bit data stream by two, described above and shown in FIG. 1B, it is clear that we can now form a generalized circuit for reducing by an arbitrary factor $m$ the rate of an arbitrarily long data stream. FIG. 2A shows such a generalized circuit.

Referring to FIG. 2A, then, we see that an $n$-bit binary data stream, $u_o$, is applied to gate circuit 203 via input lead 201. Gate circuit 203 is arranged to divert selected data bits of data stream $u_o$ to delay unit 205 in the upper branch of the leftmost element and other selected bits to delay unit 207 in the lower branch of the leftmost element. In particular, the first $2^{a-1}$ bits are diverted to the upper branch and the second $2^{a-1}$ are diverted to the lower branch where $a = \log_2 n$. That is, the input stream is bifurcated; the first half of the input bits enter the upper branch, and the other half enter the lower branch. Delay unit 205 delays the bits diverted to the upper branch by an interval $N_1$ and delay unit 207 delays the data bits diverted to the lower branch by an interval $N_1 + 2^{(a-1)k}$ where $k = m-1$. The data bits thus diverted and delayed are recombined at lead 209 to form the polynomial $u_1$. If the input polynomial $u_o$ is, $$u_0 = a_0x^0 + a_1x^1 + a_2x^2 + a_3x^3 \ldots a_{n-1}x^{n-1} ,$$

then $u_1$ is $$u_1 = x^{N_1} \left[x^0\left\{a_0x^0 + a_1x \ldots a_{n'-1}x^{n'-1}\right\} + x^{n'k}\left\{a_{n'}x^{n'} + \ldots a_{n-1}x^{n-1}\right\}\right]$$

where $n' = 2^{a-1}$ and $k = m-1$. Alternatively, $u_1$ can be written as $$u_1 = x^{N_1}\{x^0(a_0x^0 + a_1x + \ldots a_{n'-1}x^{n'-1}) + x^{n'(k+1)}(a_{n'}x^0 + a_{n'+1}x + \ldots a_{n-1}x^{n'-1})\}.$$

Proceeding in similar fashion, the data stream $u_1$ is applied to gate 210. Gate 210 diverts the first $2^{a-2}$ bits of the stream $u_1$ to the delay unit 211, the second $2^{a-2}$ bits of the stream $u_1$ to delay unit 213, the third $2^{a-2}$ bits to delay unit 211, and so on. The delay introduced by each of the delay units 211 and 213 are as shown on FIG. 2A. Clearly, the data stream $u_2$ appearing on lead 215 can be represented as follows:

$$u_2 = x^{N_1+N_2}\{x_0(a_0x^0 + a_1x \ldots a_{n''-1}x^{n''-1}) + x^{n''(k+1)}\{a_{n''}x^0 + \ldots a_{n'-1}x^{n''-1}\} + x^{n'(k+1)}(a_{n'}x^0 + \ldots a_{n'+n''-1}x^{n''-1}) + x^{(n''+n')(k+1)}(a_{n'+n''}x^0 \ldots a_{n-1}x^{n''-1})\}$$

where $n'' = 2^{a-2}$.

It is further apparent from an analysis of the circuit of FIG. 2A that the polynomial form of the data stream, $u_{a-1}$ and $u_a$ on leads 217 and 219 are respectively, $$u_{a-1} = x^{N_1+N_2 \ldots N_{a-1}}\left\{x_0(a_0x^0 + a_1x) + x^{2m}(a_2+a_3x) \ldots x^{(n-2)m}(a_{n-2}+a_{n-1}x)\right\}$$

and $$u_a = x^{\sum_{i=1}^{a} N_i}\{ax^0 + a_1x^m + a_2x^{2m} + a_3x^{3m} \ldots a_{n-2}x^{(n-2)m} + a_{n-1}x^{m(n-1)}\},$$

since $m = k+1$ and $a = \log_2 n$. It is apparent from an inspection of the equations characterizing the data stream, $u_0$, at the input of the general rate reducing circuit of FIG. 2A and the data stream, $u_a$, at the output thereof that the data stream $u_a$ has a rate $(1/m)^{th}$ that of $u_0$.

It is noted that, for the case where $a = \log_2 n$ does not yield an integer value for $a$, the circuit configuration of FIG. 2A is not altered but the gating sequence must be modified somewhat.

FIG. 2B shows a table including characteristics of a rate-reducing circuit for which $a = \log_2 n$ is not an integer. The column labeled G1 of FIG. 2B, for instance, indicates the number of bits channeled to each of the branches of the first element by the gate to which the input data stream is applied (gate 203 in FIG. 2A). Thus, if it is desired to reduce the rate of a 26-bit stream of data bits by a factor of 2, say, the circuit of FIG. 2A is implemented. However, since $n = 26$, $a$ is not an integer, and the gating in the circuit of FIG. 2A must be modified as shown in FIG. 2B. In particular, the number of bits channeled by each of the gates of the circuit are as illustrated in FIG. 2B. Specifically, gate 203 of FIG. 2A diverts the first 16 bits of the 26-bit stream to the upper branch of the leftmost element and diverts the last 10 bits only to the lower branch. Similarly, gate 210 diverts the first and third eight bits of the data stream $u_1$ to the upper branch of the adjacent element and the second eight bits and the last two bits to the lower branch.

Figure 3:
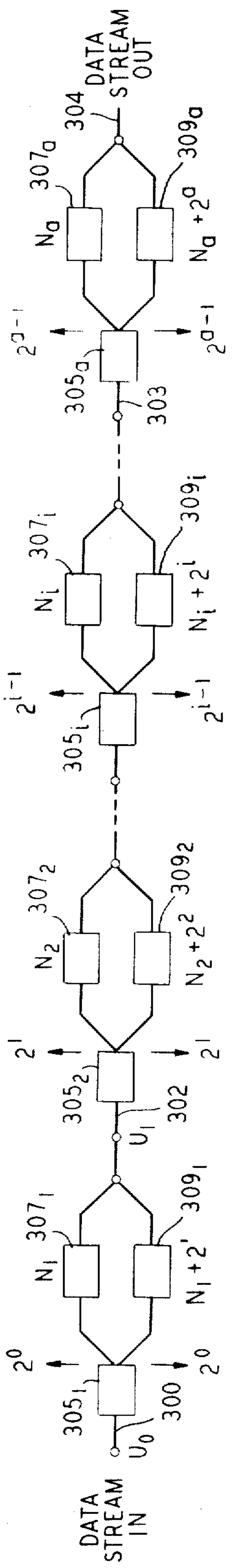
FIG. 3 shows a generalized reversing circuit in accordance with the present invention.

In addition to rate reducing, it is often necessary to completely reverse the order of bits in a data stream. A generalized circuit in accordance with the present invention, requiring but a single controlling clock, for performing the reversal of an $n$-bit data stream, is shown in FIG. 3.

In general, for reversal, the input polynomial is characterized by $$u_0 = \sum_{i=0}^{n} a_ix^i$$

and the output polynomial is represented by $$u_a = x^d \sum_{i=0}^{n} a_{n-1}x^i.$$

In order to satisfy the physical restraint that no term of the output polynomial appear at the output before it is received at the input, it is clear that $d \geq n$. In addition, to simplify calculations, it will be assumed that $n = 2^a$ where $a$ is an integer. The generalization to circuits other than those for which $n = 2^a$ is accomplished in the same manner as it was for the foregoing rate-reducing circuit.

Referring to FIG. 3, then, the polynomial representation of the data bit stream on lead 300 is $$u_0 = a_0x^0 + a_1x^1 + a_2x^2 \ldots a_{n-1}x^{n-1}.$$

Gate 305$_1$ channels the selected bits of data stream $u_0$, as shown in FIG. 3, to delay units 307$_1$ and 309$_1$, having delays as shown in FIG. 3. The resulting data stream $u_1$ appearing on lead 302 is represented as follows:

$$u_1 = x^N \left\{ (a_0x^2+a_1x) + (a_2x^4+a_3x^3) + \ldots a_{n-2}x^n + a_{n-1}x^{n-1} \right\}$$

or, $$u_1 = x^N \left\{ x(a_1+a_0x) + x^3(a_3+a_2x) + \ldots x^{n-1}(a_{n-1}+a_{n-2}x) \right\}.$$

Similarly, the polynomial representation of the bit stream on lead 303 is $$u_{a-1} = x^{\sum_{i=1}^{a-1} N_i} \{x^{n'-1}(a_{n'-1} + a_{n'-2}x \; . \; . \; . \; a_0x^{n'-1}) + x^{n-1}(a_{n-1} + a_{n-2}x \; . \; . \; . \; a_{n-n'}x^{n'-1})\}$$

where $n' = 2^{a-1} = n/2$. Finally, the polynomial representation of the data stream on lead 304 is $$u_a = x^{\sum_{i=1}^{a} N_i} \{x^{n-1}(a_{n-1} + a_{n-2}x + a_{n-3}x^2 \; . \; . \; . \; a_0x^{n-1})\}.$$

It is apparent from a comparison of the equations specifying $u_0$ and $u_a$ that $u_a$ represents a reversal of the order of the bits of $u_0$.

The minimum delay essential to the circuit is $(n-1)$ periods which satisfies the physical constraint that $a_{n-1}$ appear at the output only after it is received at the input. As mentioned above, the delay of $$\sum_{i=1}^{a} N_i$$

depends on the nature of the physical circuit construction. For example, magnetic domain circuits require a certain minimum delay whereas charge transfer or charge coupled devices do not; hence, $N_i$ in these latter instances would be zero. Delay units 307$_1$ through 307$_a$ represent the delays introduced in the upper branches of the circuit considered and delay units 309$_1$ through 309$_a$ represent the delay introduced in the lower paths.

Figure 4:
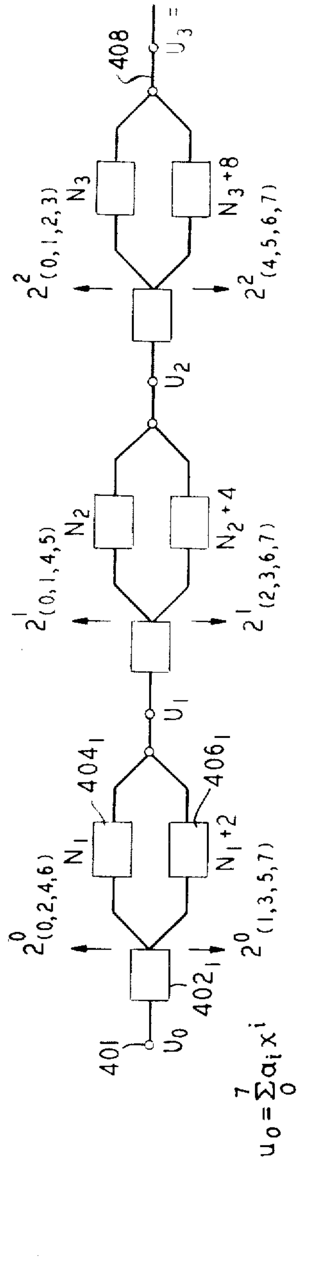
FIG. 4 shows a circuit for reversing an 8-bit data stream.

FIG. 4 illustrates an application of the circuit of FIG. 3 for the reversal of an 8-bit data stream, $$u_0 = \sum_{i=0}^{7} a_ix^i,$$

applied to the input 401 of the circuit of FIG. 4. In this instance, $n = 8$ and $a = 3$. As seen in FIG. 4, alternate positions of the data bits of the incoming data stream $u_0$ is accomplished by means of gate 402, to the upper and lower branches, respectively, of the leftmost element in FIG. 4. It is easily verified that the data stream appearing on lead 408, $u_3$, is in a reversed order from that appearing on lead 401, $u_0$.

Figure 5A:
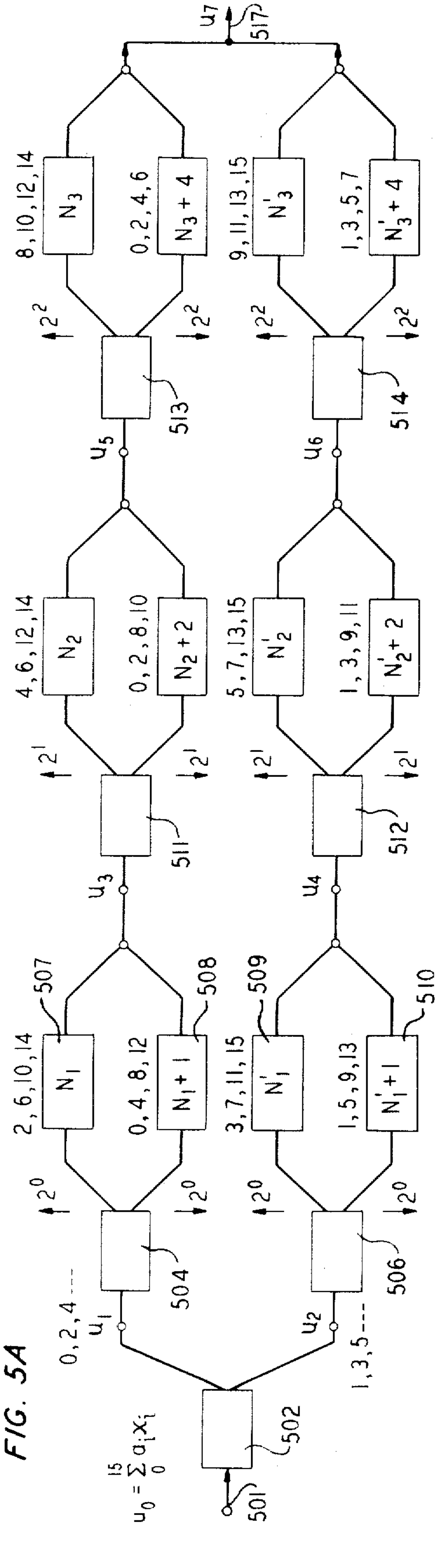
FIG. 5A shows a distributing circuit in accordance with the present invention.

FIG. 5A shows a circuit in accordance with the present invention for distributing the order of data bits in a 16-bit data stream, $u_0$, incident on input lead 501. Gate 502 channels alternate bits, as shown in FIG. 5A, to the gates 504 and 506. Gates 504 and 506, in turn, each channel alternate bits to delay units 507–510. The resulting data configurations, $u_3$ and $u_4$, are then applied to gates 511 and 512 to be diverted and delayed as indicated in FIG. 5A.

The gated and delayed sequences $u_3$ and $u_4$ are then recombined to form output sequences $u_5$ and $u_6$. These latter sequences are then gated by respective gates 513 and 514 and are selectively delayed and recombined in now standard fashion, as shown in FIG. 5A. The gated, delayed, recombined versions of $u_5$ and $u_6$ are then combined to form the output sequence $u_7$ appearing on lead 517.

Figure 5B:
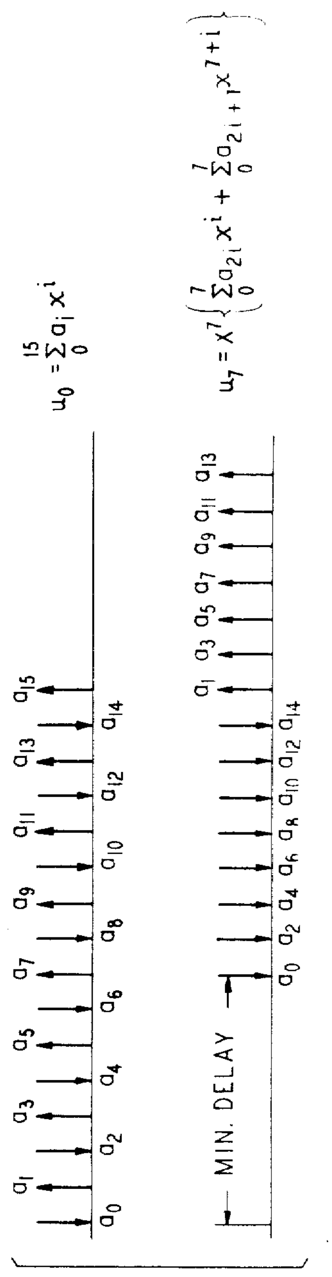
FIG. 5B shows a timing chart useful in understanding the operation of the circuit of FIG. 5A.

It can be easily demonstrated that the order of the bits of the 16-bit data stream are distributed at the output lead 517 of the circuit of FIG. 5A relative to the order in which they were applied on lead 501. FIG. 5B shows both the arrangement of the data bits of the incoming data stream and the arrangement of the data stream $u_7$ appearing on output lead 517.

In accordance with another aspect of the present invention, rate-increasing circuits are formed as inversions of rate-reducing circuits. The general technique employed is to reverse the data flow in a rate-decreasing circuit as will be illustrated in the following example.

Figure 6A:
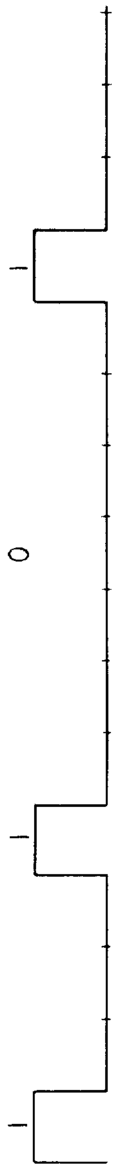
FIG. 6A illustrates a typical input sequence which is to be increased in rate.
Figure 6B:
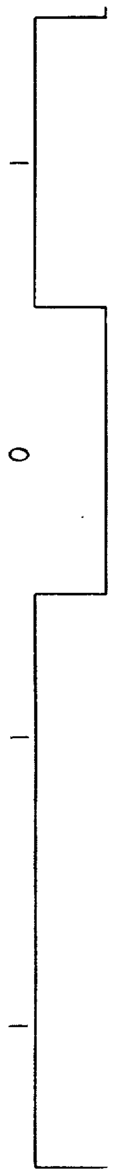
FIG. 6B is a waveform useful in deriving the waveform of FIG. 6A.
Figure 6C:
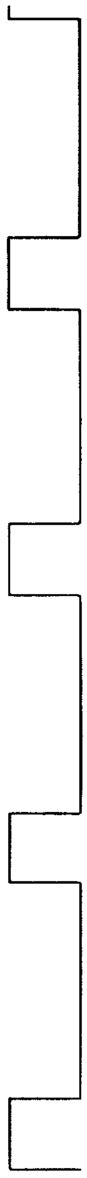
FIG. 6C is a gating waveform which is useful in generating the waveform shown in FIG. 6A from that shown in FIG. 6B.
Figure 6D:
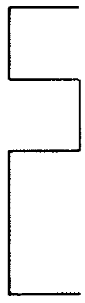
FIG. 6D shows the waveform of FIG. 6B increased in rate by a factor of 4.

Thus, suppose it is desired to enhance by a factor of 4 the rate of a data block which is 16 bits long but which only includes a bit every 4 periods. Such a block is indicated in FIG. 6A for the bit pattern 1101. It might be noted that the block of the form shown in FIG. 6A typically arises as one channel in a time multiplex system having four channels. The waveform shown in FIG. 6A may be derived from a more standard (longer bit interval) signal of the form shown in FIG. 6B by simply gating the latter in standard fashion with a periodic signal of the form shown in FIG. 6C. The desired output waveform (not reflecting delay) is of the form shown in FIG. 6D.

Figure 7:
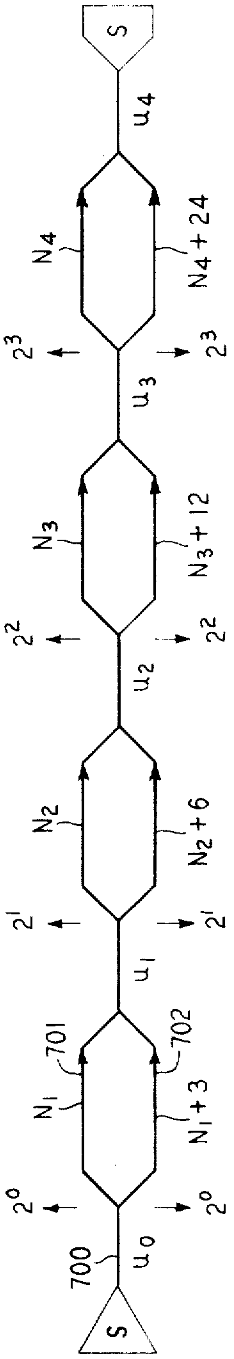
FIG. 7 is an example of a rate-increasing circuit in accordance with one embodiment of the present invention.

FIG. 7 represents the desired rate-increasing circuit for the 16-bit data block. The incoming polynomial is $$u_0 = \sum_{i=0}^{15} a_ix^{4i},$$

and $$u_1 = x^{N_1} \left\{ x^3(a_0+a_1x) + x^{11}(a_2+a_3x) + x^{19}(a_4+a_5x) + \ldots x^{59}(a_{14}+a_{15}x) \right\}$$

$$u_2 = x^{N_1+N_2} \left\{ x^9(a_0 + a_1x + a_2x^2 + a_3x^3) + x^{25}(a_4 + a_5x + a_6x^2 + a_7x^3) + \ldots + x^{57}(a_{12} + a_{13}x + a_{14}x^2 + a_{15}x^3) \right\}$$

$$u_3 = x^{N_1+N_2+N_3} \left\{x^{21}(a_0 + a_1x + \ldots a_7x^7) + x^{53}(a_8 + a_9x + a_{10}x^2 \ldots a_{15}x^7)\right\}$$

$$u_4 = x^{N_1+N_2+N_3+N_4} \left\{x^{45}(a_0 + a_1x + a_2x^2 \ldots a_{15}x^{15})\right\}.$$

The $x^{45}$ term indicates the delay for the first bit which passes through the extra $$(3+6+12+24) = (m-1)\sum_{i=0}^{a-1} 2^i$$

periods corresponding to the four stages of the rate-change circuit.

The individual gate and delay functions performed in FIG. 7 are the same as those performed, for example, in FIG. 1B. The delay units, however, are not explicitly represented; only the path delay, e.g., $N_1$, for path 701 is shown. The gate notation is also simplified; a simple path forking (such as that including input path 700 and output paths 701 and 702) is used to represent a gate of the form shown in FIG. 1C, for example.

The analysis of a generalized rate-increasing circuit in accordance with the instant invention will now be presented.

Let $m$ be the rate increase desired and n be the number of bits in the data stream. For initial calculation let us choose $n$ as a $2^a$ where $a$ is an integer. The incoming data polynomial may be written as $$u_0 = a_0x^0 + a_1x^m + a_2x^{2m} + a_3x^{3m} \ldots a_{n-1}x^{(n-1)m}.$$

After the first stage of the general rate-increasing circuit $$u_1 = x^{N_1}\left\{x^{m-1}(a_0+a_1x) + x^{3m-1}(a_2+a_3x) \ldots a^{(n-1)m-1}(a_{n-2}+a_{n-1}x)\right\}$$

After the second stage $$u_2 = x^{N1+N2}\left\{x^{3m-3}(a_0 + a_1x + a_2x^2 + a_3x^3) + \ldots + x^{(n-1)m-3}(a_{n-4} + a_{n-3}x + a_{n-2}x^2 + a_{n-1}x^3)\right\}$$

$$= x^{\sum_{i=1}^{2} N_i}\left\{x^{\sum_{i=0}^{1} 2^i(m-1)}(a_0 + a_1x + a_2x^2 + a_3x^3) + \ldots + x^{(n-1)m-\sum_{i=0}^{1} 2^i}(a_{n-4} + a_{n-3}x + a_{n-2}x^2 + a_{n-1}x^3)\right\}.$$

After the $a^{th}$ stage, $$u_n = x^{\sum_{i=1}^{a} N_i}\left\{x^{\sum_{i=0}^{a-1} 2^i(m-1)}(a_0 + a_1x + a_2x^2 + \ldots a_{n-1}x^{n-1})\right\}.$$

When it is necessary to cover the case in which $n$ is not $2^a$ but any given number, it is essential to choose an integer number, $a$, such that $$2^a \geqq n.$$

Figures 8, 9:
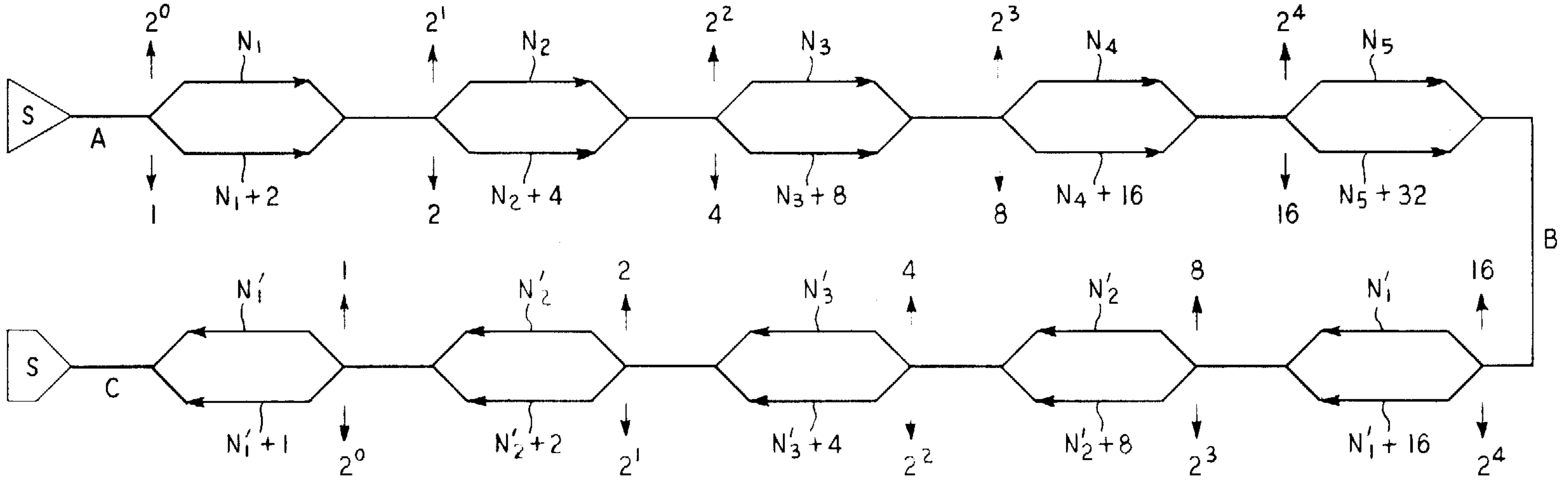
FIG. 8 is a table of parameters for a generalized rate-increasing circuit.
FIG. 9 is a composite circuit for producing a fractional rate change.

FIG. 8 indicates the characteristics of an $a$-stage version of the circuit shown in FIG. 7 for providing an $m$-fold increase in bit rate.

When it is desired to change the rate by a fraction ($m_1$:$m_2$), a combination of rate-increasing and rate-decreasing circuits may be used in series. It is then necessary to choose the main clock frequency ($f_c$) which corresponds to the lowest multiple of $m_1$, $m_2$, and the incoming data frequency ($f_{in}$). The first section of the combined circuit will enhance the frequency from $f_{in}$ to $f_c$, and the second section will reduce from $f_c$ to the desired frequency of $f_{in}m_2/m_1$. For instance if the input rate is 2,400 baud and it is desired to obtain 3,600 baud, then a clock rate of 7,200 cycles per second will be necessary. The entire circuit for this example is shown in FIG. 9 for a data block 32 bits long. Again, the notation of FIG. 7 has been employed. The operation of the individual gates and delay units in FIG. 9 is precisely as for the other combinations described above.

Collating and distributing functions are commonly found in such communications contexts as time-division-multiplex transmission and switching systems. See, for example, U.S. Pat. No. 3,700,819 issued to M. J. Marcus on Oct. 24, 1972, and assigned to the assignee of the present application. Two circuits which are exemplary of the application of the present inventive principles to collating and distributing circuits will now be given.

Thus, suppose for 4-bit inputs from channels 1, 2, 3, and 4 are to be collated onto one channel. Let the incoming polynomials be $$u_1 = a_0x^0 + a_1x + a_2x^2 + a_3x^3,$$

$$u_2 = a_4x^4 + a_5x^5 + a_6x^6 + a_7x^7,$$

$$u_3 = a_8x^8 + a_9x^9 + a_{10}x^{10} + a_{11}x^{11},$$

and $$u_4 = a_{12}x^{12} + a_{13}x^{13} + a_{14}x^{14} + a_{15}x^{15}.$$

Figure 10A:
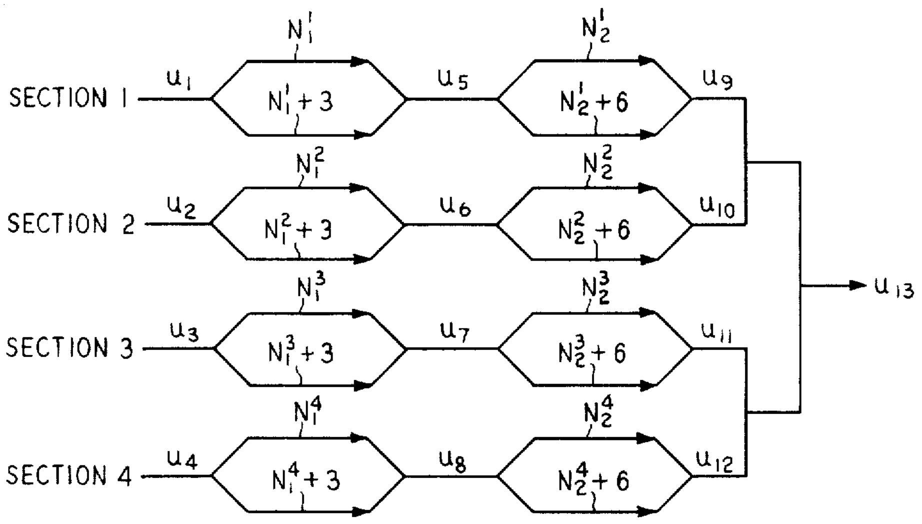
FIG. 10A illustrates a collating circuit using basic rate-decreasing circuits in accordance with another aspect of the present invention.
Figure 10B:
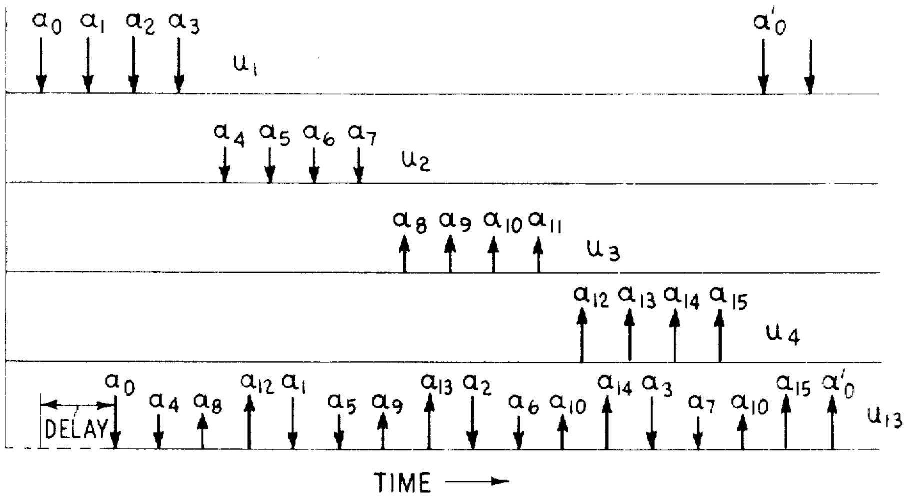
FIG. 10B is a timing chart useful in understanding the operation of the circuit of FIG. 10A.

FIG. 10A illustrates the application of these inputs to a collating circuit in accordance with one embodiment of the present invention. FIG. 10B illustrates the gating sequences for the individual sections of the circuit of FIG. 10A.

Each of the sections 1, 2, 3, and 4 in FIG. 10A must accomplish a rate reduction of 1:4. Let $N_1^1$ and $N_2^1$ be the number of periods in top sections of 1, $N_1^2$ and $N_2^2$ be the number of periods in top sections of 2, $N_1^3$ and $N_2^3$ be the number of periods in top sections of 3, and $N_1^4$ and $N_2^4$ be the number of periods in top sections of 4. As described above, the lower halves of sections 1, 2, 3, and 4 are $(N_1^1+3)$, $(N_2^1+6)$, and so on. The polynomial $u_5$ between the two stages of the first section is $$u_5 = x^{N_1^1}\{(a_0 + a_2x^2) + x^4(a_1 + a_3x^2)\},$$

and so on. The polynomials $u_9$, $u_{10}$, $u_{11}$, and $u_{12}$ may be calculated as $$u_9 = x^{N_1^1+N_2^1}\left\{a_0 + a_1x^4 + a_2x^8 + a_3x^{12}\right\}$$

$$u_{10} = x^{N_1^2+N_2^2+4}\left\{a_4 + a_5x^4 + a_6x^8 + a_7x^{12}\right\}$$

$$u_{11} = x^{N_2^3+N_2^3+8}\left\{a_8 + a_9x^4 + a_{10}x^8 + a_{11}x^{12}\right\}$$

$$u_{12} = x^{N_1^4+N_2^4+12}\left\{a_{12} + a_{13}x^4 + a_{14}x^8 + a_{15}x^{12}\right\}.$$

The periods in sections 1, 2, 3, and 4 are chosen such that $$N_1^1 + N_2^1 = N_1^4 + N_2^4 + 9$$
$$N_2^2 + N_2^2 = N_1^4 + N_2^4 + 6 \qquad (1)$$
$$N_3^2 + N_2^3 = N_1^4 + N_2^4 + 3.$$

If the technology for implementation permits $N_1^4 + N_2^4 = 0$, e.g., charge coupled devices, then $$u_9 = x^9(a_0 + a_1x^4 + a_2x^8 + a_3x^{12})$$
$$u_{10} = x^{10}(a_4 + a_5x^4 + a_6x^8 + a_7x^{12})$$
$$u_{11} = x^{11}(a_8 + a_9x^4 + a_{10}x^8 + x_{11}x^{12})$$
$$u_{12} = x^{12}(a_{12} + a_{13}x^4 + a_{14}x^8 + a_{15}x^{12})\ .$$

The output polynomial $u_{13}$ can be written as:

$$u_{13} = x^9\{a_0 + a_4x + a_8x^2 + a_{12}x^3 + a_1x^4 + a_5x^5 + a_9x^6 + a_{13}x^7 + a_2x^8 + a_6x^9 + a_{10}x^{10} + a_{14}x^{11} + a_3x^{12} + a_7x^{13} + a_{11}x^{14} + a_{15}x^{15}\}; \quad (2)$$

and $x^9$ corresponds to the minimum delay in circuit. It can be seen that $N_1^4 + N_2^4$ need not equal zero. However, equations 1 must be satisfied. Under these conditions a fixed delay between the input and output results. Further, it is to be noted that equations 1 must be chosen with care to ascertain that the output polynomial $u_{13}$ has each of its term $a_bx^c$ satisfying the equation $$(\text{minimum delay}) + c \geqq b \quad (3)$$

where $b$ is the power of $x$ in any one of the terms $a_bx^c$ in the input polynomial. Physically relation 2 implies that no term in the output appears before it has been received at the input terminal. In equations 1, as $b$ varies between 0 and 15, the corresponding values of $c$ in equation 2 satisfy relation 3.

Other generalizations of this circuit can be readily obtained by changing the number of stages (depending upon the number of bits in $u_1$, $u_2$ ... etc.) and the number of inputs to be collated. Reversing the direction of propagation yields a reversal of input and output polynomials leading to the distributing circuit.

Many variations to the specific apparatus and techniques specified herein will be apparent to those skilled in the art. In particular, it is evident that various other circuit arrangements using the basic element configuration described can be produced for operating on data streams. In particular, a number of basic element configurations can be combined and rearranged in a variety of ways to yield desired functions.

While the above description has proceeded in terms of particular fixed functions, e.g., rate-increasing rate-decreasing, and the like, it is clear that by using a variable delay device (such as a tapped shift register or delay line) and gating means which responds to a programmable clock, it is possible to develop a general purpose circuit for performing a variety of data manipulating operations in response to varying circuit requirements. In particular, it proves advantageous in some cases to provide a memory for storing (cyclically or otherwise) a stored set of control signals. These may then be read out in standard fashion for application with the gating circuits associated with the various embodiments described above.

What is claimed is:

1. Apparatus responsive to a single clock for processing an input sequence of $n$ data signals, where $n = 2^a$ and $a$ is an integer, each of said signals occurring during a respective input interval, said apparatus comprising A. an ordered plurality of $a$ stages, each comprising
 1. an input terminal and an output terminal,
 2. a source of periodic control signals,
 3. a plurality of transmission paths, each having a first and second terminal, and each interposing a different transmission delay,
 4. gating means responsive to said control signals for diverting selected ones of signals applied at said input terminal to the first terminal of respective selected ones of said plurality of paths, said gating means comprising a plurality of paths, said gating means comprising a plurality of AND gates, each having a plurality of input leads and one output lead, first input means for applying signals in said input sequence to each of said AND gates, and second input means for applying said control signals to each of said AND gates, thereby to enable signals in said sequence to appear on selected ones of said output leads of said AND gates,
 5. means interconnecting each of said second terminals and said output terminals, B. means for connecting the output terminal of each stage except the last to the input terminal of the immediately following stage, and C. means for applying said input sequence of signals at the input terminal of the first of said ordered stages, and wherein $m$ is the integer ratio of the input rate of said input sequence to the rate of the processed sequence appearing at the output terminal of the $a$th of said stages, wherein said plurality of paths comprises two paths, and wherein at the $i$th stage, $i = 1,2,\ldots,a$, said delay in one of said two paths exceeds the delay in the other of said two paths by an amount equal to $(m-1)2^{a-1}$ input signal intervals.

2. Apparatus according to claim 1, wherein at the ith stage said gating means comprising means for diverting alternate subsequences, each including $2^{a-i}$ signals, presented at said input terminal to respective alternate ones of said two paths.

3. Apparatus responsive to a single clock for processing an input sequence of $n$ data signals, where $n = 2^a$ and $a$ is an integer, each of said signals occurring during a respective input interval, said apparatus comprising A. an ordered plurality of $a$ stages, each comprising
 1. an input terminal and an output terminal,
 2. a source of periodic control signals,
 3. a plurality of transmission paths, each having a first and second terminal, and each interposing a different transmission delay,
 4. gating means responsive to said control signals for diverting selected ones of signals applied at said input terminal to the first terminal of respective selected ones of said plurality of paths, said gating means comprising a plurality of AND gates, each having a plurality of input leads and one output lead, first input means for applying signals in said input sequence to each of said AND gates, and second input means for applying said control signals to each of said AND gates, thereby to enable signals in said sequence to appear on selected ones of said output leads of said AND gates,
 5. means interconnecting each of said second terminals and said output terminals, B. means for connecting the output terminal of each stage except the last to the input terminal of the immediately following stage, and C. means for applying said input sequence of signals at the input terminal of the first of said ordered stages, and wherein said processing comprises reversing the order of said input sequence, wherein said plurality of paths comprises two paths, and wherein at the $i$th stage, $i = 1,2,...,a$, said delay in one of said two paths exceeds the delay in the other of said paths by $2^i$ input signal intervals.

4. Apparatus according to claim 3 wherein at said ith stage said gating means comprises means for diverting alternate subsequences of signals, each including $2^{i-1}$ signals, presented at said input terminal to respective alternate ones of said two paths.

5. Apparatus responsive to a single clock for processing an input sequence of $n$ data signals, where $n = 2^a$ and $a$ is an integer, each of said signals occurring during a respective input interval, said apparatus comprising A. an ordered plurality of $a$ stages, each comprising 1. an input terminal and an output terminal,
2. a source of periodic control,
3. a plurality of transmission paths, each having a first and second terminal, and each interposing a different transmission delay,
4. gating means responsive to said control signals for diverting selected ones of signals applied at said input terminal to the first terminal of respective selected ones of said plurality of paths, said gating means comprising a plurality of AND gates, each having a plurality of input leads and one output lead, first input means for applying signals in said input sequence to each of said AND gates, and second input means for applying said control signals to each of said AND gates, thereby to enable signals in said sequence to appear on selected ones of said output leads of said AND gates,
5. means interconnecting each of said second terminals and said output terminals, B. means for connecting the output terminal of each stage except the last to the input terminal of the immediately following stage, and C. means for applying said input sequence of signals at the input terminal of the first of said ordered stages, wherein $m$ is the integer ratio of the output rate of the processed sequence appearing at the output terminal of the $a$th of said stages to said input sequence; wherein said plurality of paths comprises two paths, and wherein at the $i$th stage, $i = 1,2,...,a$, said delay in one of said two paths exceeds the delay in the other of said two paths by an amount equal to $2^{i-1}(m-1)$ input signal intervals.

6. Apparatus according to claim 5 wherein at said ith stage said gating means comprises means for diverting alternate subsequences, each including $2^{i-1}$ signals, presented at said input terminal to respective alternate ones of said two paths.

7. Apparatus according to claim 6 wherein said $2^a$ stages are divided into subsets of consecutive stages, each of said subsets including $a$ stages, and wherein one of said subsets provides a rate increase of $m_1$ and the other of said subsets provides a rate decrease of $m_2$, neither $m_1$ nor $m_2$ being an integer multiple of the other, whereby the sequence appears at the output terminal of the $2^a$ th stage at a rate $m_1/m_2$ times the rate of said input sequence.

* * * * *